US009784855B2

(12) United States Patent
Ullberg et al.

(10) Patent No.: US 9,784,855 B2
(45) Date of Patent: Oct. 10, 2017

(54) RADIATION DETECTOR AND METHOD FOR REDUCING THE AMOUNT OF TRAPPED CHARGE CARRIERS IN A RADIATION DETECTOR

(71) Applicant: XCOUNTER AB, Danderyd (SE)

(72) Inventors: Christer Ullberg, Sollentuna (SE); Mattias Urech, Nacka (SE); Niclas Weber, Enebyberg (SE)

(73) Assignee: XCounter AB, Danderyd (SE)

( * ) Notice: Subject to any disclaimer, the term of this patent is extended or adjusted under 35 U.S.C. 154(b) by 0 days.

(21) Appl. No.: 15/114,695

(22) PCT Filed: Feb. 20, 2015

(86) PCT No.: PCT/SE2015/050196
§ 371 (c)(1),
(2) Date: Jul. 27, 2016

(87) PCT Pub. No.: WO2015/126319
PCT Pub. Date: Aug. 27, 2015

(65) Prior Publication Data
US 2017/0003402 A1    Jan. 5, 2017

(30) Foreign Application Priority Data

Feb. 20, 2014    (SE) ....................... 1450207

(51) Int. Cl.
*G01T 1/24*    (2006.01)
*G01T 1/18*    (2006.01)
(52) U.S. Cl.
CPC . *G01T 1/24* (2013.01); *G01T 1/18* (2013.01)
(58) Field of Classification Search
CPC .................................... G01T 1/18; G01T 1/24
See application file for complete search history.

(56) References Cited

U.S. PATENT DOCUMENTS 5,563,421 A    10/1996    Lee et al.
2010/0078558 A1    4/2010    Prokesch et al.
(Continued)

FOREIGN PATENT DOCUMENTS

DE    102012200549    4/2013
EP    0473125    3/1992
(Continued)

OTHER PUBLICATIONS

International Search Report for Corresponding PCT Application No. PCT/SE2015/050196, dated Jun. 17, 2015, 5 pages.
(Continued)

*Primary Examiner* — David Porta
*Assistant Examiner* — Faye Boosalis
(74) *Attorney, Agent, or Firm* — Myers Bigel, P.A.

(57) ABSTRACT

A semiconductor based photon counting detector comprising a substrate (11) of semiconductor material; a detector bias voltage supply (12) for applying a detector bias voltage over the substrate, each time during a data acquisition period ($t_1$); a readout arrangement (13) for repetitively reading out data indicative of charges freed in, and transported through, the substrate (11) in response to photons being absorbed, each time during a readout period ($t_2$) following a data acquisition period, wherein the data contain number of charge pulses of photons being absorbed; an external light source (15) for exposing the substrate for light to enable trapped charge carriers to escape from defect levels in the substrate; and a control device (14) operatively connected to the detector bias voltage supply, the readout arrangement, and the external light source. The control device (14) is configured to control the detector bias voltage supply to switch off the detector bias voltage over the substrate and the external light source (15) to switch on the light, thus exposing the substrate (11) for light to enable trapped charge (Continued)

carriers to escape from defect levels in the substrate, concurrently during at least some of said readout periods.

23 Claims, 3 Drawing Sheets

(56) References Cited

U.S. PATENT DOCUMENTS

| | | |
|---|---|---|
| 2010/0078559 A1 | 4/2010 | Szeles et al. |
| 2011/0128359 A1 | 6/2011 | Yokoyama et al. |

FOREIGN PATENT DOCUMENTS

| | | |
|---|---|---|
| EP | 1018655 | 7/2000 |
| JP | 2008 070253 A | 3/2008 |
| JP | 2009 011526 A | 1/2009 |
| WO | WO 2004/095067 | 11/2004 |

OTHER PUBLICATIONS

Extended European Search Report Corresponding to European Application No. 15752066.9 (7 pages) (Aug. 22, 2017).

RADIATION DETECTOR AND METHOD FOR REDUCING THE AMOUNT OF TRAPPED CHARGE CARRIERS IN A RADIATION DETECTOR

RELATED APPLICATIONS

This application is a 35 USC §371 national phase application of PCT/SE2015/050196, filed Feb. 20, 2015, which claims the benefit of and priority to Swedish Application No. 1450207-4, filed Feb. 20, 2014, the contents of which are hereby incorporated by reference as if recited in full herein.

TECHNICAL FIELD

The technical field relates to semiconductor based X ray or gamma ray radiation detectors.

DESCRIPTION OF RELATED ART

In semiconductor detectors, the detector consists of a slab of semiconductor material with electrodes on the opposite faces of the semiconductor. The detector material is depleted in free carriers and a high voltage electric field is applied between the electrodes using an outside bias. High-energy photons from an outside radioactive source or x-ray tube induce electron-hole pairs in the semiconductor volume through photoelectric or Compton interactions. The interaction is a two-step process where the high-energy electrons created in the photoelectric or Compton event lose their energy through repeated electron-hole ionization. Due to the high cross section of this process, the electron-hole pairs form a highly localized charge cloud only few micro-meters in diameter.

One important aspect of the photon interaction for imaging is that the number of electron-hole pairs created via the photoelectric effect is proportional to the photon energy. The charge cloud of electrons and holes is separated in the electric field and the electrons and holes move toward opposite electrodes, creating a temporary current through the device. This current is typically integrated by a charge-sensitive preamplifier to measure the total charge induced by the outside radiation. Alternatively, the detector is a photon counting device that actually counts the number of absorbed photons by means of reading out the electron pulses caused by the interactions.

During a measurement, typically a detector voltage is applied over the electrodes, which means that electron-hole pairs are created continuously during the measurement period. However, following each signal acquisition period, a period occurs, during which no further electron-hole pairs are detected. In imaging of patients, or portions thereof, the detectors may need to have very high repetition rates, which means that the signal acquisition time in each frame may be as low as 1 ms, whereas the readout time may be 200 microseconds or shorter.

A problem with the semiconductors is the occurrence of deep-level defects within the doped semiconductors, which may capture charge carriers and reduce the residual net free carrier concentration. These trapped negative and positive charge carriers cause a space-charge formation and affect the overall electric field in the semiconductor and may cause noise. In a resulting image, some pixels may be white (due to high concentration of the electric field towards this pixel, whereas some pixels will be black (due to low concentration of the electric field towards this pixel).

US 2010/0078559 A1 discloses a solution wherein the residence time of charge carriers is dramatically reduced by an external optical energy source and the occupancy of the deep-level defects is maintained close to the thermal equilibrium of the un-irradiated device even under high-flux exposure conditions. Instead of relying on thermal energy to release the trapped carriers, infrared light radiation is used to provide sufficient energy for the trapped carriers to escape from defect levels. $Cd_{1-x}Zn_xTe$ crystals are transparent to infrared light of this energy and no additional absorption occurs other than the one associated with the ionization of the targeted deep-level defects. This allows irradiation geometry from the side source of the $Cd_{1-x}Zn_xTe$ detector crystals.

However, a drawback with the approach of US 2010/0078559 A1 is that it requires that the crystals of the detector are transparent to the light of the external optical energy source allowing no additional absorption. This may restrict the range of external optical energy sources usable.

A further drawback is that the sensitivity of the detector may be reduced since the released charge carriers will be mixed with the charge carriers created via interaction between the radiation to be detected and the crystals of the detector and interfere with the detection. This may not normally be a problem, but at low radiation flux, the released charge carriers may cause non-acceptable deterioration of the detection sensitivity.

A yet further drawback is that released negative and positive charge carriers do not recombine efficiently, which will further reduce the detector sensitivity.

A still further drawback is that the exposure of the crystals for the infrared light radiation increases the dark current of the detector.

EP 1018655 B1 discloses a method for removing prior exposure artifacts in a radiation detection panel and more particularly to a method for operating and reading out information from an X-ray detection panel by continuously cycling the panel and using pre and post exposure information to minimize residual image. According to one embodiment of the method, the panel is constantly undergoing cycling as follows: At a time t1 the high DC voltage (VC) is gradually applied to the top electrode. Once the full voltage is applied, at a time t2, it is maintained at this level until a time t3. The DC voltage is next gradually returned to ground (or zero) at a time t4 and the storage capacitors for all detector elements (pixels) are read out. The data from the capacitors is stored in a memory. At a time t5, following readout, the panel is, preferably, flooded with uniform illuminating radiation, such as visible radiation, again preferably from both sides, until a time t6. This step may be identical to the illumination step described in U.S. Pat. No. 5,563,421. At time t6, the illuminating step is terminated, and the high DC voltage is reapplied to the top electrode. This cycle is repeated continuously and the readout data from each readout is stored in the memory, replacing the previously acquired stored data. During this mode of operation the panel is said to be in the standby mode.

When an imaging exposure is to occur, the panel is again subjected to the gradual application of a DC voltage to the top electrode. While the DC voltage remains applied to the top electrode, imaging radiation exposure occurs. Following radiation exposure, the charges stored in the capacitors are again readout, and the exposure pixel data is stored in a different memory location or another memory, without replacing the data of the immediately preceding panel readout.

Following radiation exposure, the panel returns to the standby mode and continues to be cycled through the illumination, high DC voltage application, capacitor readout and so on steps as before exposure. The data from the exposure last preceding the imaging exposure is preserved for use in correcting the exposure data.

However, such procedure is not applicable to imaging at very high repetition rates since each frame contains a further time period t6-t5 with the only purpose of illuminating the panel with radiation, such as visible radiation, preferably from both sides.

SUMMARY

It is an aim of this document to disclose radiation detectors and methods by which at least some of the above drawbacks can be eliminated, or at least alleviated.

A first aspect refers to a semiconductor based photon counting detector comprising a substrate of semiconductor material; a detector bias voltage supply for applying a detector bias voltage over the substrate, each time during a data acquisition period; a readout arrangement for repetitively reading out data indicative of charges freed in, and transported through, the substrate in response to photons being absorbed, each time during a readout period following a data acquisition period, wherein the data contain number of charge pulses of photons being absorbed; an external light source for exposing the substrate for light to enable trapped charge carriers to escape from defect levels in the substrate; and a control device operatively connected to the detector bias voltage supply, the readout arrangement, and the external light source.

The control device is configured to control the detector bias voltage supply to switch off the detector bias voltage over the substrate and the external light source to switch on the light, thus exposing the substrate for light to enable trapped charge carriers to escape from defect levels in the substrate, concurrently during at least some of said readout periods.

The control device may be configured to control the detector bias voltage supply to switch off the detector bias voltage over the substrate and the external light source to switch on the light such that the substrate is exposed for light in a cyclic manner wherein the substrate is exposed for said light only during periods of time, each of which following a period of time, during which the radiation detector is configured to detect radiation.

The control device may be configured to control the detector bias voltage supply to switch off the detector bias voltage over the substrate and the external light source to expose the substrate for light concurrently during each of said readout periods.

The control device may be configured to control the detector bias voltage supply to switch on the detector bias voltage over the substrate and to switch off the external light source, each time at an end of a readout period, at a time before the end of a readout period, or at a time after the end of a readout period.

The control device may be configured to control the detector bias voltage supply to have the detector bias voltage applied over the substrate and the external light source to not expose the substrate for light during each of said data acquisition periods.

The data acquisition periods may each be between about 0.1 ms and about 500 ms, preferably between about 0.5 ms and about 200 ms, and more preferably between about 1 ms and about 100 ms.

The readout periods are each between about 0.01 ms and about 10 ms, preferably between about 0.1 ms and about 5 ms, and more preferably between about 1 ms and about 4 ms.

By the above aspect, the amount of trapped charge carriers are reduced by exposing the substrate of semiconductor material for light only during periods, which are separated from those, during which the radiation detector is used for detecting radiation, i.e. the above data acquisition periods.

This means that the repetition rate of the detector can be kept high; the exposing of the substrate of semiconductor material for light does not affect the repetition rate et all since it is performed during already existing readout periods. Such solution can not be performed with the detector disclosed in EP 1018655 B1 since it is accumulating charges and such detector would be affected by the freed charges, which would cause the readout to be deteriorated or even useless. In the aspect above, a photon counting detector is used, and in this detector the pixels are "locked" during readout and consequently the freed charges from the light exposure would not affect the readout.

Further, the substrate of the detector does not have to be transparent to the light used. Any freed charge carriers created by absorption of the light in the substrate may be accelerated through there, but will not interfere with the detection. For the same reason, the trapped charge carries which are released by the light exposure will neither interfere with the detection.

Still further, the dark current will be reduced as soon as the light is switched off at the start of each period, during which the radiation detector is used for detecting radiation, i.e. the above data acquisition period.

Yet further, an increased signal-to-noise ratio can be obtained.

A cyclic detector bias voltage, which is only applied over the substrate during the periods of time, during which the radiation detector is used for detecting radiation, i.e. i.e. the above data acquisition period, will further reduce amount of charge carriers that get trapped at deep-level defects in the substrate of the detector.

Also, the absence of the detector bias voltage during the exposure of the substrate for the light enable efficient recombination of released negative and positive charge carriers.

An advantage of this aspect is that no measurement frames are "lost", and the total measurement time will not increase. On the other hand, it puts higher requirements on the switching speed of the light and the detector bias voltage. In some applications wherein the repetition rate may be 1 kHz or higher, hardware limitations may restrict the use of this aspect.

Therefore, this document proposes a solution, which may be used when hardware limitations may restrict the use of the first aspect.

A second aspect thus refers to a semiconductor based detector comprising a substrate of semiconductor material; a detector bias voltage supply for applying a detector bias voltage over the substrate, each time during a data acquisition period; a readout arrangement for repetitively reading out data indicative of charges freed in, and transported through, the substrate in response to photons being absorbed, each time during a readout period following a data acquisition period; an external light source for exposing the substrate for light to enable trapped charge carriers to escape from defect levels in the substrate; and a control device operatively connected to the detector bias voltage supply, the readout arrangement, and the external light source.

The control device is configured to control the detector bias voltage supply to switch off the detector bias voltage over the substrate and the external light source to switch on the light, thus exposing the substrate for light to enable trapped charge carriers to escape from defect levels in the substrate, concurrently during substrate treatment periods, each of which following a measurement period, wherein each measurement period comprises a plurality of data acquisition periods and a plurality of readout periods.

Each of the substrate treatment periods may comprise at least part of a data acquisition period or one or a plurality of readout periods and/or one or a plurality of data acquisition periods.

The control device may be configured to control the detector bias voltage supply to switch off the detector bias voltage over the substrate and the external light source to switch on the light in a cyclic manner.

The control device may be configured to control the detector bias voltage supply to have the detector bias voltage applied over the substrate and the external light source to not expose the substrate for light during each of said measurement periods.

The data acquisition periods are each shorter than about 10 ms, preferably shorter than about 5 ms, more preferably shorter than about 1 ms, and most preferably shorter than about 0.5 ms.

The readout periods are each shorter than about 5 ms, preferably shorter than about 1 ms, more preferably shorter than about 0.5 ms, and most preferably shorter than about 0.1 ms.

The measurement periods may each be at least about 3 times longer, preferably at least about 3 times longer, more preferably at least about 5 times longer, and most preferably at least 10 times longer, than each of the substrate treatment periods.

This aspect is particularly advantageous for very high repetition rate applications, wherein the readout periods are so short that hardware restrictions may restrict the switching of the detector bias voltage supply during such readout periods. Instead, the detector bias voltage is switched off during the substrate treatment period, and any readouts made during this period may simply be discarded. A loss of data will occur depending on the size of the substrate treatment period as compared to the size of the measurement period.

The radiation detector may in each of the aspects be a Cd—Te or Cd—Zn—Te based photon counting radiation detector such as a Cd—Te or Cd—Zn—Te based camera for two-dimensional imaging.

A third aspect refers to a method for reducing the amount of trapped charge carriers in a semiconductor based radiation detector comprising a substrate of semiconductor material; a detector bias voltage supply for applying a detector bias voltage over the substrate, each time during a data acquisition period; a readout arrangement for repetitively reading out data indicative of charges freed in, and transported through, the substrate in response to photons being absorbed, each time during a readout period following a data acquisition period, wherein the data contain number of charge pulses of photons being absorbed; and an external light source for exposing the substrate for light to enable trapped charge carriers to escape from defect levels in the substrate. According to the method, the detector bias voltage supply is controlled to switch off the detector bias voltage over the substrate and the external light source is controlled to switch on the light, thus exposing the substrate for light to enable trapped charge carriers to escape from defect levels in the substrate, concurrently during at least some of said readout periods.

A fourth aspect refers to a method for reducing the amount of trapped charge carriers in a semiconductor based detector comprising a substrate of semiconductor material; a detector bias voltage supply for applying a detector bias voltage over the substrate, each time during a data acquisition period; a readout arrangement for repetitively reading out data indicative of charges freed in, and transported through, the substrate in response to photons being absorbed, each time during a readout period following a data acquisition period; and an external light source for exposing the substrate for light to enable trapped charge carriers to escape from defect levels in the substrate. According to the method the detector bias voltage supply is controlled to switch off the detector bias voltage over the substrate and the external light source is controlled to switch on the light, thus exposing the substrate for light to enable trapped charge carriers to escape from defect levels in the substrate, concurrently during substrate treatment periods, each of which following a measurement period, wherein each measurement period comprises a plurality of data acquisition periods and a plurality of readout periods.

The third and fourth aspects may be modified to incorporate method steps for performing any of the actions disclosed above with reference to the first and second aspects.

Further characteristics and advantages will be evident from the detailed description of embodiments given hereinafter, and the accompanying FIGS. 1-3, which are given by way of illustration only.

DETAILED DESCRIPTION OF EMBODIMENTS

Figure 1:
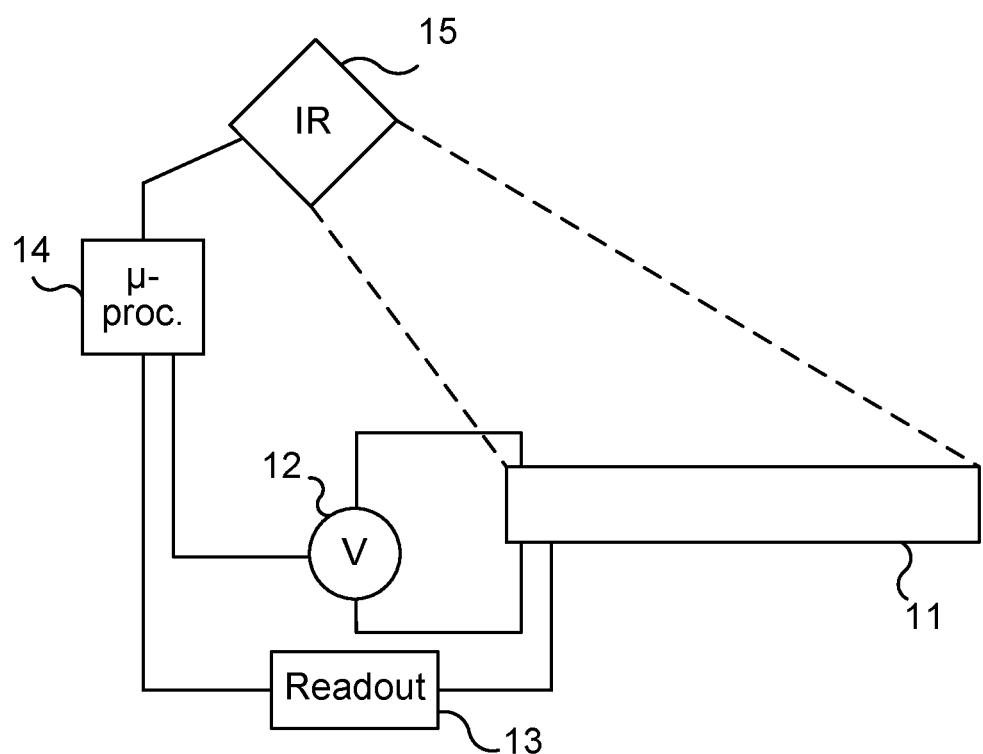
FIG. 1 illustrates, schematically, a radiation detector according to one embodiment.

FIG. 1 illustrates, schematically, a semiconductor based X ray or gamma ray radiation detector according to one embodiment. The radiation detector comprises a substrate 11 of semiconductor material, a detector bias voltage supply 12 for applying a detector bias voltage over the substrate, a readout arrangement 13 for reading out data indicative of charges freed in, and transported through, the substrate 11, and a control device 14 operatively connected to the detector bias voltage supply 12 and the readout arrangement 13 for controlling the same. The radiation detector may be a Cd—Te or Cd—Zn—Te based radiation detector.

Examples of detector layouts and substrate materials are further disclosed in U.S. Pat. No. 5,379,336; U.S. Pat. No. 6,933,505; U.S. Pat. No. 7,170,062; U.S. Pat. No. 7,189,971; U.S. Pat. No. 7,361,881; US 2006/011853; US2006/071174; and US2008/019477, the contents of which being hereby incorporated by reference.

The radiation detector further comprises an external light source 15 for exposing the substrate 11 for light to enable trapped charge carriers to escape from defect levels in the substrate 12. The control device 14 is configured to control the external light source 15 to expose the substrate 11 for light, e.g. infrared light, to enable trapped charge carriers to escape from defect levels in the substrate 11 in a cyclic manner such that the substrate 11 is exposed for the light only during periods of time, of which each follows a period of time, during which the radiation detector is configured to detect radiation.

The external light source 15 for exposing the substrate 11 for light to enable trapped charge carriers to escape from defect levels in the substrate 12 may be an infrared light source such as an infrared light emitting diode providing infrared light of suitable wavelengths and powers. Given a known radiation detector structure and layout, suitable infrared light wavelengths and powers can be calculated as well as found by empirical studies by a person skilled in the art.

The control device 14 may be configured to also control the detector bias voltage supply 12 to apply a detector bias voltage over the substrate 11 in a cyclic manner such that the detector bias voltage is applied over the substrate 11 only during the data acquisition periods of time, during which the radiation detector is configured to detect radiation.

Figure 2:
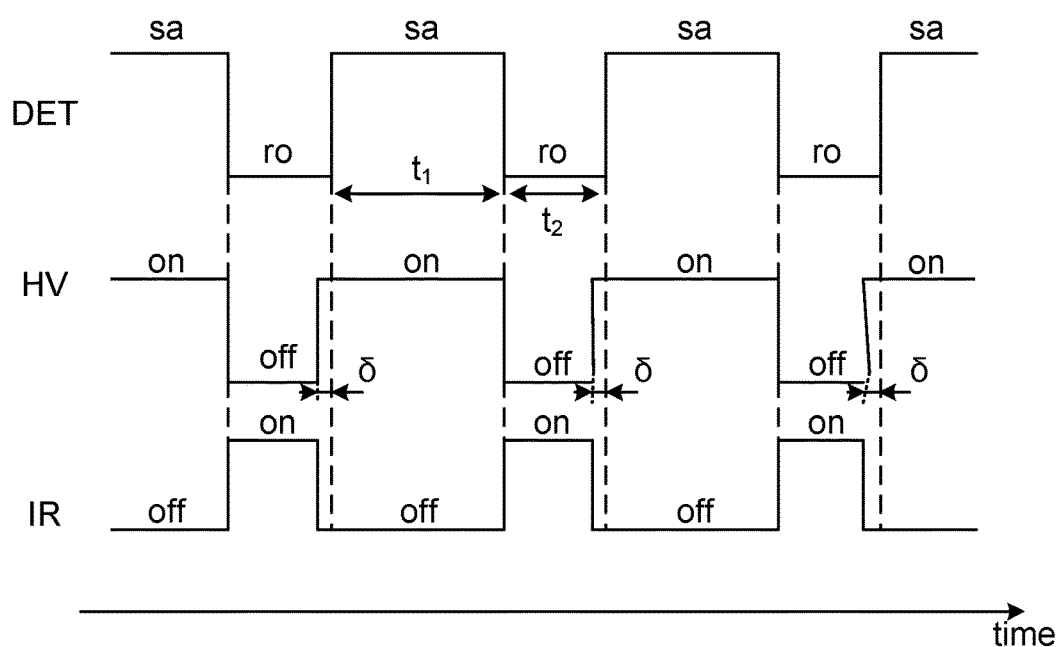
FIG. 2 illustrates, schematically, timing diagrams for radiation detection, detector bias voltage, and infrared light exposure in accordance with an approach for reducing the amount of trapped charged carriers in a radiation detector.

FIG. 2 illustrates, schematically, timing diagrams for radiation detection DET, detector bias voltage HV, and infrared light exposure IR in accordance with an approach for reducing the amount of trapped charged carriers in a radiation detector such as the one of FIG. 1.

The radiation detector is configured to detect radiation repeatedly in measurement frames, wherein each measurement frame comprises a data acquisition time period sa and a readout time period ro, wherein the data acquisition time period sa has a length $t_1$ and the readout time period ro has a length $t_2$, where $t_1 > t_2$. The repetition rate of the radiation detection is $1/(t_1+t_2)$.

The control device 14 may be configured to control the detector bias voltage supply 12 to apply the detector bias voltage HV over the substrate 11 such that the detector bias voltage HV is switched on only during data acquisition time periods sa and to control the external light source 15 to expose the substrate 11 for the light IR such that the light is switched on only during readout time periods ro. In such a manner, the switchings of the detector bias voltage HV and the light IR are synchronized with the radiation detections DET, and the frequencies of the switching of the detector bias voltage HV and the light IR are identical with the repetition rate of the radiation detection DET.

the data acquisition periods are each between about 0.1 ms and about 500 ms, preferably between about 0.5 ms and about 200 ms, and more preferably between about 1 ms and about 10 ms, and/or the readout periods are each between about 0.01 ms and about 10 ms, preferably between about 0.1 ms and about 5 ms, and more preferably between about 1 ms and about 4 ms.

If required, the detector bias voltage HV can be switched on shortly before each data acquisition time period sa is started as indicated by the short time period δ in FIG. 2 such that detector bias voltage HV has time to rise to a proper level before each data acquisition time period sa starts. Alternatively, the detector bias voltage HV can be switched on when, or shortly after, each data acquisition time period sa is started.

Figure 3:
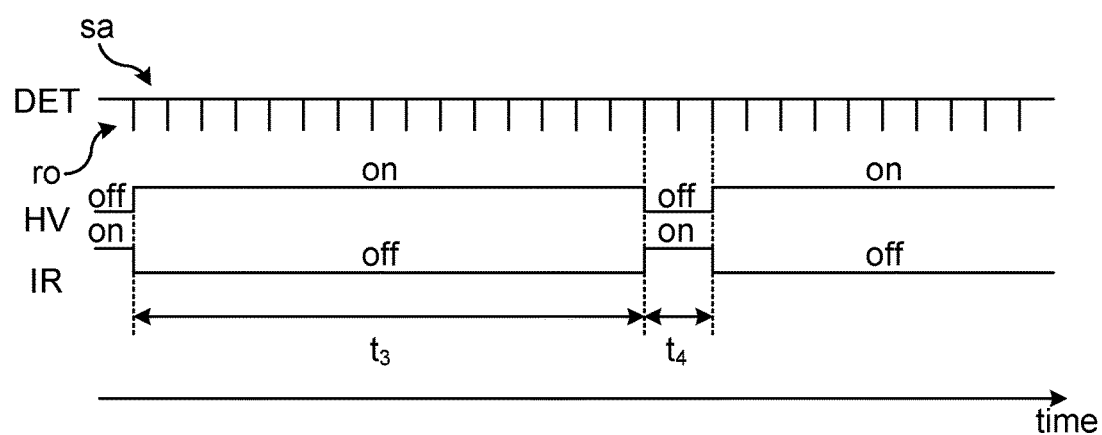
FIG. 3 illustrates, schematically, timing diagrams for radiation detection, detector bias voltage, and infrared light exposure in accordance with an approach for reducing the amount of trapped charged carriers in a radiation detector.

FIG. 3 illustrates, schematically, timing diagrams for radiation detection DET, detector bias voltage HV, and infrared light exposure IR in accordance with an alternative approach for reducing the amount of trapped charged carriers in a radiation detector such as the one of FIG. 1.

The radiation detector is configured to detect radiation repeatedly in measurement frames, wherein each measurement frame comprises a data acquisition time period sa and a readout time period ro, as in the previous illustrated embodiment. In FIG. 3, the readout time periods ro are indicated as spikes to illustrate that they are each much shorter than the data acquisition time periods sa.

The control device 14 may be configured to control the detector bias voltage supply 12 to apply the detector bias voltage HV over the substrate 11 such that the detector bias voltage HV is switched on during a plurality of measurement frames (data acquisition time periods sa and readout time periods ro), during which the radiation detector is configured to detect radiation and read out the data, and is switched off during a time corresponding to one or more measurement frames. The time period, during which the bias voltage HV is switched on is denoted by $t_3$ and is referred to as a measurement period, and the time period, during which the bias voltage HV is switched off is denoted by $t_4$ and is referred to as a substrate treatment period. During the time period, during which the bias voltage HV is switched off, data may or may not be read out by the readout arrangement 13. If data are read out, they may simply be discarded.

The control device 14 may further be configured to control the external light source 15 to expose the substrate 11 for the light IR such that the light is switched on only during the time periods, during which the bias voltage HV is switched off.

In such a manner, the switchings of the detector bias voltage HV and the light IR are synchronized with the radiation detections DET, and the frequencies of the switching of the detector bias voltage HV and the light IR are lower than the repetition rate of the radiation detection DET.

The data acquisition periods $t_1$ may each be shorter than about 10 ms, preferably shorter than about 5 ms, more preferably shorter than about 1 ms, and most preferably shorter than about 0.5 ms, and/or the readout periods $t_2$ may each be shorter than about 5 ms, preferably shorter than about 1 ms, more preferably shorter than about 0.5 ms, and most preferably shorter than about 0.1 ms.

The measurement periods $t_3$ may each be at least about 3 times longer, preferably at least about 3 times longer, more preferably at least about 5 times longer, and most preferably at least 10 times longer, than each of the substrate treatment periods t4.

Alternatively, the control device 14 may be configured to control the detector bias voltage supply 12 to apply a detector bias voltage HV over the substrate 11 only during the data acquisition time periods sa of the time periods $t_3$. But this calls for a detector bias voltage HV switching that matches the readout periods.

It shall be appreciated by a person skilled in the art that the above disclosed embodiments may be modified to form further embodiments falling within the terms of the claims.

The invention claimed is:

1. A semiconductor based photon counting detector comprising:
   a substrate of semiconductor material;
   a detector bias voltage supply for applying a detector bias voltage over the substrate, each time during at least one data acquisition period ($t_1$);
   a readout arrangement for repetitively reading out data indicative of charges freed in, and transported through, the substrate in response to photons being absorbed, each time during at least one readout period ($t_2$) following at least one associated data acquisition period, wherein the data contain number of charge pulses of photons being absorbed;

an external light source for exposing the substrate for light to allow trapped charge carriers to escape from defect levels in the substrate; and a control device operatively connected to the detector bias voltage supply, the readout arrangement, and the external light source, wherein the control device controls the detector bias voltage supply to switch off the detector bias voltage over the substrate and the external light source to switch on the light, thus exposing the substrate for light to allow the trapped charge carriers to escape from the defect levels in the substrate, concurrently during at least some of the at least one readout period.

2. The detector of claim 1 wherein the control device controls the detector bias voltage supply to switch off the detector bias voltage over the substrate and the external light source to switch on the light such that the substrate is exposed for light in a cyclic manner, wherein the substrate is exposed for the light only during readout periods of time ($t_2$), each following a data acquisition period of time ($t_1$), during which the radiation detector to detects radiation.

3. The detector of claim 1, wherein the at least one readout period is a plurality of readout periods, and wherein the control device controls the detector bias voltage supply to switch off the detector bias voltage over the substrate and the external light source to expose the substrate for light concurrently during each of said readout periods.

4. The detector of any of claim 1, wherein the at least one readout period ($t_2$) is a plurality of readout periods, and wherein the control device controls the detector bias voltage supply to switch on the detector bias voltage over the substrate and controls the external light source to switch off the external light source, each time at a time ($\delta$) before the end of a respective readout period of the plurality of the readout periods, or at a time after the end of a respective readout period of the plurality of the readout periods.

5. The detector of claim 1, wherein the at least one data acquisition period ($t_1$) is a plurality of data acquisition periods, and wherein the control device controls (i) the detector bias voltage supply to have the detector bias voltage applied over the substrate and (ii) the external light source to not expose the substrate for light during each of said data acquisition periods.

6. The detector of claim 1, wherein the data acquisition periods are each between about 0.1 ms and about 500 ms, and/or the readout periods are each between about 0.01 ms and about 10 ms.

7. A semiconductor based detector, comprising:
a substrate of semiconductor material;
a detector bias voltage supply for applying a detector bias voltage over the substrate, each time during a data acquisition period ($t_1$);
a readout arrangement for repetitively reading out data indicative of charges freed in, and transported through, the substrate in response to photons being absorbed, each time during a readout period ($t_2$) following a data acquisition period;
an external light source for exposing the substrate for light to allow trapped charge carriers to escape from defect levels in the substrate; and
a control device operatively connected to the detector bias voltage supply, the readout arrangement, and the external light source, wherein the control device is configured to control the detector bias voltage supply to switch off the detector bias voltage over the substrate and the external light source to switch on the light, thus exposing the substrate for light to allow the trapped charge carriers to escape from the defect levels in the substrate, concurrently during substrate treatment periods ($t_4$), each of which following a measurement period ($t_3$), wherein each measurement period comprises a plurality of data acquisition periods and a plurality of readout periods.

8. The detector of claim 7, wherein each of the substrate treatment periods comprises at least part of a data acquisition period.

9. The detector of claim 7, wherein each substrate treatment period comprises one or a plurality of readout periods and/or one or a plurality of data acquisition periods.

10. The detector of claim 7, wherein the control device controls the detector bias voltage supply to switch off the detector bias voltage over the substrate and the external light source to switch on the light in a cyclic manner.

11. The detector of claim 7, wherein the control device controls the detector bias voltage supply to have the detector bias voltage applied over the substrate and the external light source to not expose the substrate for light during each of said measurement periods.

12. The detector of claim 7, wherein the data acquisition periods are each shorter than about 10 ms, and/or the readout periods are each shorter than about 5 ms.

13. The detector of claim 7, wherein the measurement periods are each at least about 3 times longer than the substrate treatment periods.

14. A method for reducing the amount of trapped charge carriers in a semiconductor based photon counting detector comprising a substrate of semiconductor material; a detector bias voltage supply for applying a detector bias voltage over the substrate, each time during a data acquisition period ($t_1$); a readout arrangement for repetitively reading out data indicative of charges freed in, and transported through, the substrate in response to photons being absorbed, each time during a readout period ($t_2$) following a data acquisition period, wherein the data contain number of charge pulses of photons being absorbed; and an external light source for exposing the substrate for light to enable trapped charge carriers to escape from defect levels in the substrate, the method comprising:

controlling the detector bias voltage supply to switch off the detector bias voltage over the substrate and controlling the external light source to switch on the light, thus exposing the substrate for light to allow trapped charge carriers to escape from defect levels in the substrate, concurrently during at least some readout periods.

15. The method of claim 14, wherein the method further comprises substrate treatment periods ($t_4$), each of which follows a measurement period ($t_3$), wherein each measurement period comprises a plurality of data acquisition periods and a plurality of readout periods, wherein the controlling is carried out to direct the detector bias voltage supply to switch off the detector bias voltage over the substrate and direct the external light source to switch on the light such that the substrate is exposed for light in a cyclic manner, wherein the substrate is exposed for said light only during periods of time ($t_4$; $t_2$), each of which following a period of time ($t_3$; $t_1$), during which the radiation detector is configured to detect radiation.

16. The method of claim 14 wherein the detector bias voltage supply is controlled to switch off the detector bias voltage over the substrate and the external light source is controlled to expose the substrate for light concurrently during each of said readout periods.

17. The method of claim 14, wherein the controlling is carried out so that the detector bias voltage supply is controlled to have the detector bias voltage applied over the substrate and so that the external light source is controlled to not expose the substrate for light during each of the data acquisition periods.

18. The method of claim 14, wherein the data acquisition periods are each between about 0.1 ms and about 500 ms and/or the readout periods are each between about 0.01 ms and about 10 ms.

19. A method for reducing the amount of trapped charge carriers in a semiconductor based detector comprising a substrate of semiconductor material; a detector bias voltage supply for applying a detector bias voltage over the substrate, each time during a data acquisition period ($t_1$); a readout arrangement for repetitively reading out data indicative of charges freed in, and transported through, the substrate in response to photons being absorbed, each time during a readout period ($t_2$) following a data acquisition period; and an external light source for exposing the substrate for light to enable trapped charge carriers to escape from defect levels in the substrate, the method comprising: controlling the detector bias voltage supply to switch off the detector bias voltage over the substrate and controlling the external light source to switch on the light, thus exposing the substrate for light to allow trapped charge carriers to escape from defect levels in the substrate, concurrently during substrate treatment periods ($t_4$), each of which following a measurement period ($t_3$), wherein each measurement period comprises a plurality of data acquisition periods ($t_1$) and a plurality of readout periods ($t_2$).

20. The method of claim 19, wherein each of the substrate treatment periods comprises at least part of a data acquisition period.

21. The method of claim 19, wherein each substrate treatment period comprises one or a plurality of readout periods and/or one or a plurality of data acquisition periods.

22. The method of claim 19, wherein the controlling is carried out to control the detector bias voltage supply to switch off the detector bias voltage over the substrate and the external light source to switch on the light in a cyclic manner.

23. The method of claim 19, wherein the data acquisition periods are each shorter than about 10 ms, and/or the readout periods are each shorter than about 5 ms.

* * * * *

UNITED STATES PATENT AND TRADEMARK OFFICE
CERTIFICATE OF CORRECTION

PATENT NO. : 9,784,855 B2  
APPLICATION NO. : 15/114695  
DATED : October 10, 2017  
INVENTOR(S) : Ullberg et al.

Page 1 of 1

It is certified that error appears in the above-identified patent and that said Letters Patent is hereby corrected as shown below:

On the Title Page

(30) Foreign Application Priority Data: Please correct "1450207" to read -- 1450207-4 --

In the Claims

Column 9, Claim 2, Line 25: Please correct "detector to detects radiation" to read -- detector detects radiation. --

Signed and Sealed this  
Twentieth Day of February, 2018

Andrei Iancu  
*Director of the United States Patent and Trademark Office*